United States Patent
Ho

(10) Patent No.: US 10,769,357 B1
(45) Date of Patent: Sep. 8, 2020

(54) MINIMIZING EYE STRAIN AND INCREASING TARGETING SPEED IN MANUAL INDEXING OPERATIONS

(71) Applicant: Open Text Corporation, Waterloo (CA)

(72) Inventor: Ming Fung Ho, Fremont, CA (US)

(73) Assignee: Open Text Corporation, Waterloo (CA)

(*) Notice: Subject to any disclaimer, the term of this patent is extended or adjusted under 35 U.S.C. 154(b) by 798 days.

(21) Appl. No.: 13/720,630

(22) Filed: Dec. 19, 2012

(51) Int. Cl.
*G06F 40/174* (2020.01)

(52) U.S. Cl.
CPC .................. *G06F 40/174* (2020.01)

(58) Field of Classification Search
CPC ........ G06F 17/24; G06F 17/25; G06F 17/243; G06T 11/60; A63F 2300/5553; A63F 2300/6623
USPC ................. 715/201, 202, 230, 255
See application file for complete search history.

(56) References Cited

U.S. PATENT DOCUMENTS

| | | | | |
|---|---|---|---|---|
| 5,621,904 A * | 4/1997 | Elliott | ............... | G06F 3/0481 715/798 |
| 5,832,100 A * | 11/1998 | Lawton | ............... | G06F 17/243 382/100 |
| 6,732,193 B1 * | 5/2004 | Burton | ............... | G06F 3/061 710/5 |
| 7,251,782 B1 * | 7/2007 | Albers | ............... | G06F 3/0481 715/708 |
| 7,509,576 B2 * | 3/2009 | Kanai | ............... | G06F 17/212 715/200 |
| 2004/0239763 A1 * | 12/2004 | Notea | ............... | H04N 5/222 348/169 |
| 2006/0101051 A1 * | 5/2006 | Carr | ............... | G06F 17/243 |
| 2007/0209015 A1 * | 9/2007 | Ritter | ............... | G06F 3/0237 715/780 |
| 2009/0049375 A1 * | 2/2009 | Aughenbaugh | ..... | G06F 3/04883 715/253 |
| 2010/0241507 A1 * | 9/2010 | Quinn | ............... | G06Q 30/02 705/14.42 |
| 2013/0136242 A1 * | 5/2013 | Ross | ............... | H04M 3/51 379/85 |
| 2014/0053111 A1 * | 2/2014 | Beckman | ............ | G06F 3/04812 715/856 |

OTHER PUBLICATIONS

EMC (R) Captiva (R) Dispatcher (TM) Version 6.5, Dispatcher (TM) Validation Guide, Copyright (C) 2011 EMC Corporation. pp. 45-58.

EMC (R) Captiva (R) InputAccel (R), Version 6.5, IndexPlus Guide, Copyright (C) 2011 EMC Corporation. pp. 1-21, 39-41, and 153-156.

* cited by examiner

*Primary Examiner* — Kavita Padmanabhan
*Assistant Examiner* — Jenq-Kang Chu
(74) *Attorney, Agent, or Firm* — Sprinkle IP Law Group

(57) ABSTRACT

Techniques to validate data are disclosed. In various embodiments, an indication of a data entry form field to be validated is received. A current value associated with the data entry form field is displayed in a validation interface provided via a display device. A snippet or other partial image of a portion of a source document with which the data entry form is associated is displayed in a location adjacent or otherwise in a same field of view as the displayed current value associated with the data entry form field. The portion includes a content image that was processed to extract the current value from the source document.

24 Claims, 9 Drawing Sheets

MINIMIZING EYE STRAIN AND INCREASING TARGETING SPEED IN MANUAL INDEXING OPERATIONS

BACKGROUND OF THE INVENTION

Manual indexing is the operator task of visually locking onto text on an image and transcribing it into an electronic form by keying. Such work may be performed, for example, by human operators assigned to perform manual validation of results of an automated document capture process. Documents are scanned and data values are extracted automatically. For example, extraction may be done by OCR (optical character recognition), but OCR is rarely 100% accurate. In cases of doubt, or OCR is incorrect, or when a validation rule indicates an error, a human operator may be required to compare the extracted data to the image of the scanned document to determine if the correct value was extracted and if not to enter a correction.

The time it takes to lock onto text is generally described by Fitts' Law, a model that relates human movement as a function of the distance to and size of target. In short, the shorter the distance and larger the target, the less the targeting time.

A source of eye strain due to prolonged manually indexing work may come from one or both of the following two areas: 1) large repetitive movements, and 2) locking onto a narrow area (tunnel vision). Indexing in a commercial setting may require the operator to enter data at a rate of a field every 1.5 seconds or better, continuously for 8 hours per day (with a break every hour), for example.

BRIEF DESCRIPTION OF THE DRAWINGS

Various embodiments of the invention are disclosed in the following detailed description and the accompanying drawings.

DETAILED DESCRIPTION

Figure 1:
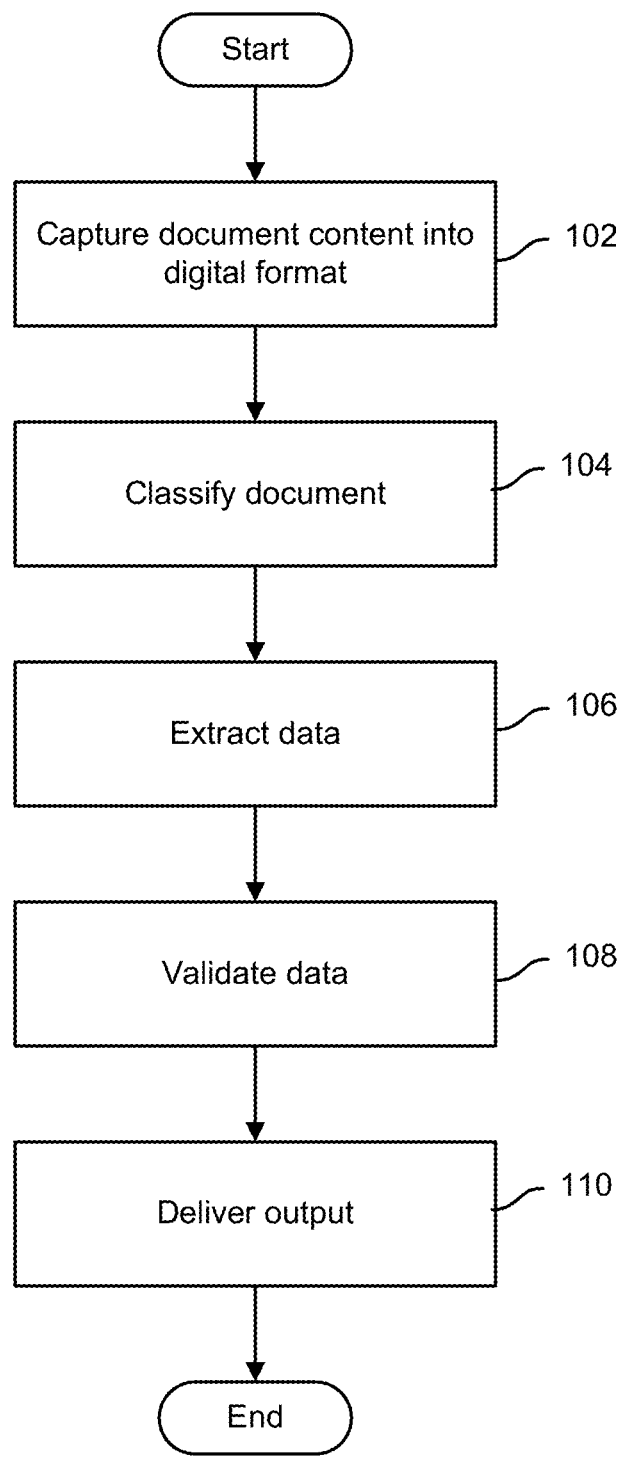
FIG. 1 is a flow chart illustrating an embodiment of a process to capture data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to minimize eye strain and increase targeting speed in manual indexing operations are disclosed. In various embodiments, a snippet of a document image showing just the portion that includes the text or other content to be validated and the validation message and/or control are displayed very close to the corresponding data-entry field, such that the three items (validation message, current value in data-entry filed, and text image) are all along the line of eye motion. In some embodiments, the snippet size is automatically balanced for targeting and readability, for example by making the snippet large enough to see and the scaling the text to fill enough of the viewable area to make it easy to read. In some embodiments, auto-panning of the data entry form is performed to minimize retargeting. For example, as validation of a first field is completed, for example upon the operator hitting the "enter" key, the next form field and corresponding snippet are displayed in approximately the same location on the display screen. In some embodiments, to avoid tunnel vision the validation message or other confirmation visual is displayed about 5% of the time in a location that requires the eye to move at least 20% across the screen.

FIG. 1 is a flow chart illustrating an embodiment of a process to capture data. In the example shown, document content is captured into a digital format (102), e.g., by scanning the physical sheet(s) to create a scanned image. The document is classified (104). In some embodiments, classification includes detecting a document type corresponding to an associated data entry form. Data is extracted from the digital content (106), for example through optical character recognition (OCR) and/or optical mark recognition (OMR) techniques. Extracted data is validated (108). In various embodiments, validation may be performed at least in part by an automated process, for example by comparing multiple occurrences of the same value, by performing computations or other manipulations based on extracted data, etc. In various embodiments, all or a subset of extracted values, e.g., those for which less than a required degree of confidence is achieved through automated extraction and/or validation, may be validated manually, by a human indexer or other operator. Once all data has been validated, output is delivered (110), e.g., by storing the document image and associated data in an enterprise content management system or other repository.

Figure 2:
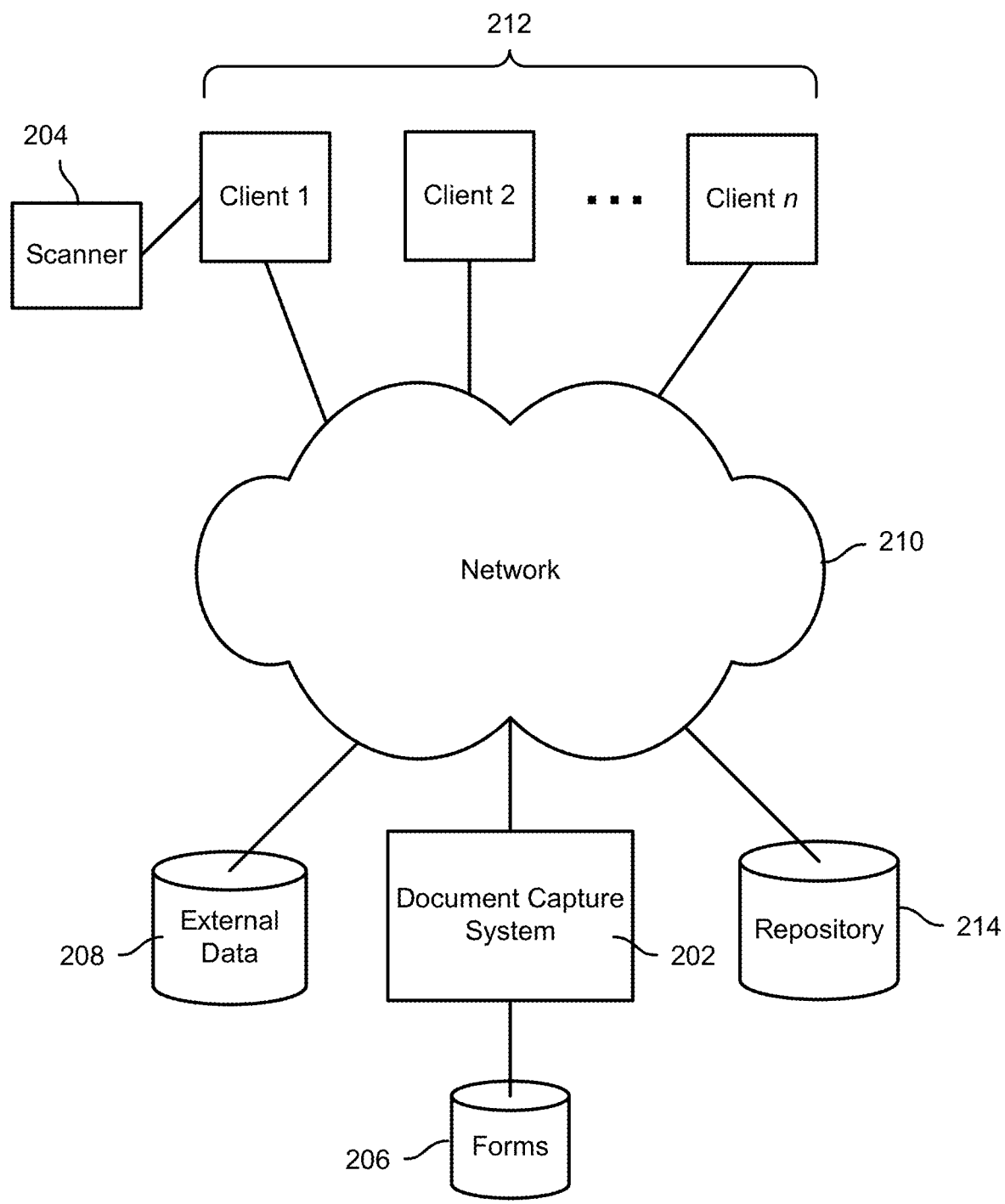
FIG. 2 is a block diagram illustrating an embodiment of a document capture system and environment.

FIG. 2 is a block diagram illustrating an embodiment of a document capture system and environment. In the example shown, a client system 212 is attached to a scanner 204. Documents are scanned by scanner 204 and the resulting document image is sent by the client system 212 to document capture system 202 for processing, e.g., using all or part of the process of FIG. 1. In the example shown, document capture system 202 uses a library of data entry forms 206 to create a structured representation of data extracted from a scanned document. For example, as in FIG. 1 steps 104 and 106, in some embodiments a document is classified by type and an instance of a corresponding data entry form is created and populated with data values extracted from the document image. In some embodiments, data validation may be performed, at least in part, by document capture system 202 by accessing external data 208 via a network 210. For example, an external third party database that associates street addresses with correct postal zip codes may be used to validate a zip code value extracted from a document. In the example shown, validation may be performed at least in part by a plurality of manual indexers each using an associated client system 212 to communicate via network 210 with document capture system 202. For example, document capture system 202 may be configured to queue human validation tasks and to serve tasks out to indexers using clients 212. Each client system 212 may use a browser based and/or installed client software provided functionality to validate data as described herein. In some embodiments, once validation has been completed the resulting raw document image and/or form data are delivered as output, for example by storing the document image and associated form data in a repository 214, such as an enterprise content management (ECM) or other repository.

Figure 3:
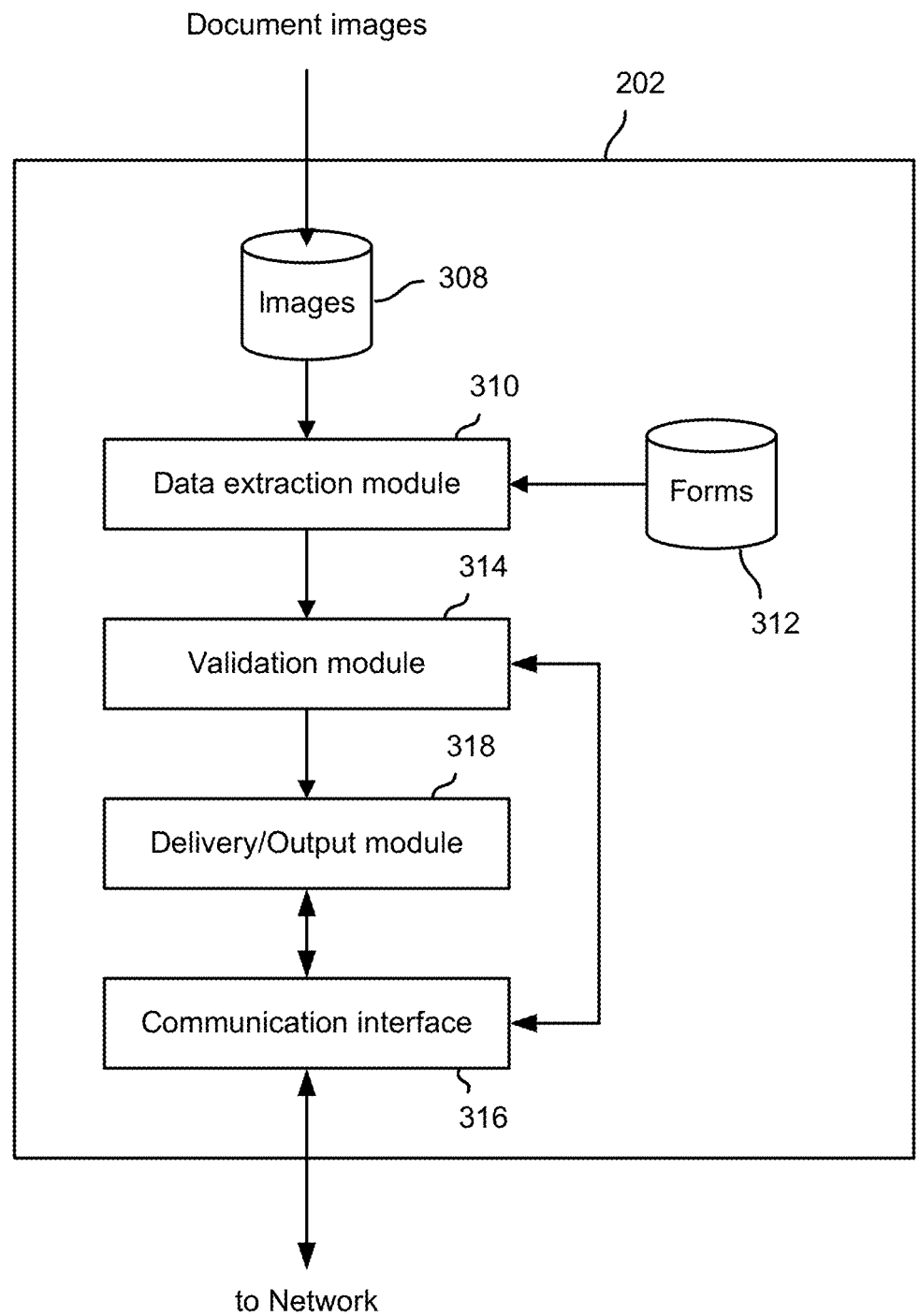
FIG. 3 is a block diagram illustrating an embodiment of a document capture system.

FIG. 3 is a block diagram illustrating an embodiment of a document capture system. In the example shown, the document capture system 202 of FIG. 2 is shown to receive document image data, e.g., via network 204 from a scanning client system 212. Document image data is received in some embodiments in batches and is stored in an image store 308. Document image data is provided to a data extraction module 310 which uses a data entry forms library 312 to classify each document by type and create an instance of a type-specific data entry form. Data extraction module 310 uses OCR, OMR, and/or other techniques to extract data values from the document image and uses the extracted values to populate the corresponding data entry form instance. In some embodiments, data extraction module 310 may provide a score or other indication of a degree of confidence with which an extracted value has been determined based on a corresponding portion of the document image. In some embodiments, for each data entry form field a corresponding location within the document image from which the data value entered by the extraction module in that form field was extracted, for example the portion that shows the text to which OCR or other techniques were applied to determine the text present in the image, is recorded. In the example shown, the data extraction module 310 provides the populated form to a validation module 314 configured to perform validation (automated and/or human as configured and/or required). In some embodiments, the validation module 314 applies one or more validation rules to identify fields that may require a human operator to validate. In the example shown, the validation module 314 may communicate via a communications interface 316, for example a network interface card or other communications interface, to obtain external data to be used in validation and/or to generate and provide to human indexers via associated client systems, such as one or more of clients 212 of FIG. 2, tasks to perform human/manual validation of all or a subset of form fields. The validated data is provided to a delivery/output module 318 configured to provide output via communication interface 316, for example by storing the document image and/or extracted data (structured data as capture using the corresponding data entry form) in an enterprise content management system or other repository.

Figure 4:
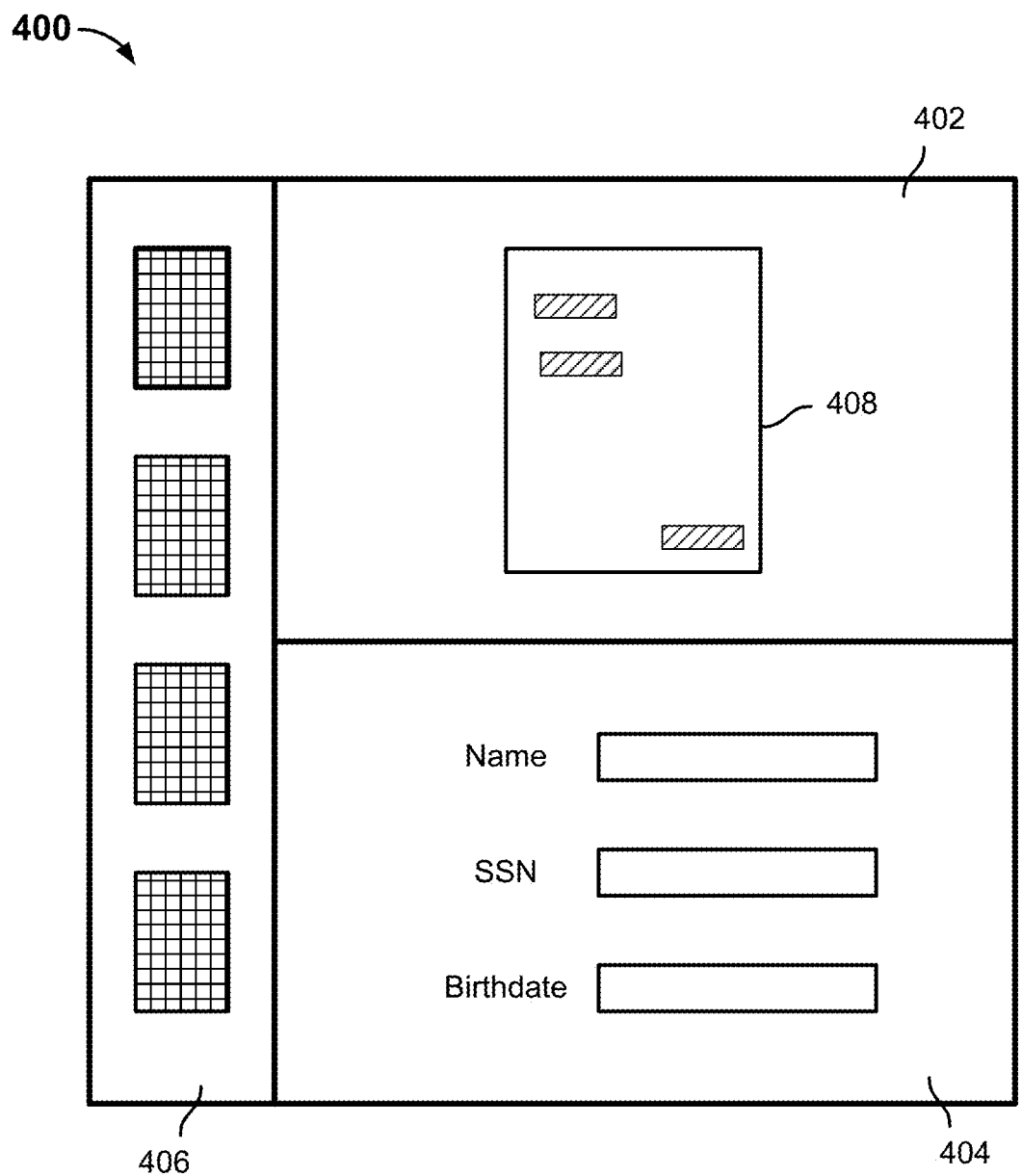
FIG. 4 is a block diagram illustrating an embodiment of a data validation user interface.

FIG. 4 is a block diagram illustrating an embodiment of a data validation user interface. In the example shown, validation interface 400 includes a document image display area 402, a data entry form interface 404, and a navigation frame 406. A document image 408 is displayed in document image display area 402. In the example shown, portions of document image 408 that correspond to data entry form fields in the form shown in data entry form interface 404 are highlighted, as indicated in FIG. 4 by the cross-hatched rectangles in document image 408 as shown. In this example, thumbnails are shown in navigation pane 406, each corresponding for example to an associated document and/or page from which data has been captured. In this example, the topmost thumbnail image as shown in navigation frame 406 of FIG. 4 is highlighted (thicker outer outline), indicating that document image 408 as displayed in document image display area 402 corresponds to the topmost thumbnail. In some embodiments, controls are provided (e.g., on screen controls, key stokes or combinations, etc.) to enable the operator to pan, scroll, and/or zoom in/out with respect to the document image 408, for example to focus and zoom in on (magnify) a particular portion of the document image 408. In some embodiments, as the operator validates each field a cursor advances to the next field and a corresponding portion of the document image 408 is highlighted.

Figure 5:
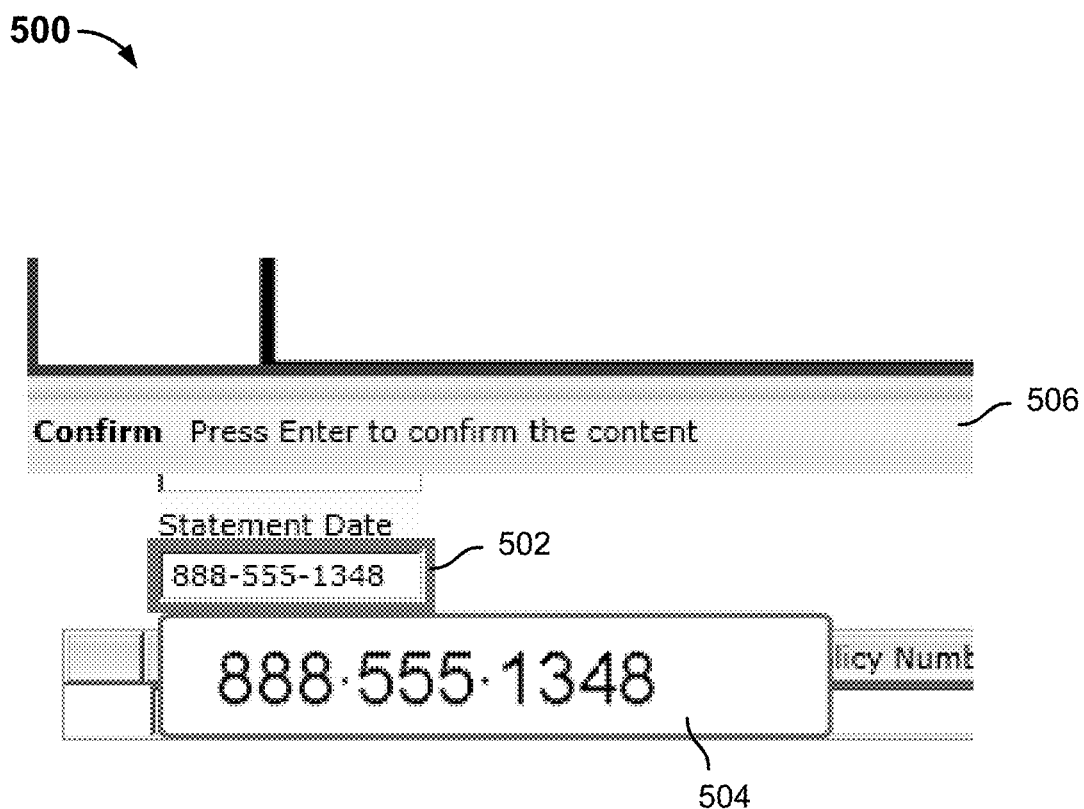
FIG. 5 is a screen shot illustrating an embodiment of a technique to minimize eye strain and/or fatigue in manual indexing.

FIG. 5 is a screen shot illustrating an embodiment of a technique to minimize eye strain and/or fatigue in manual indexing. In the example shown, partial screen shot 500 includes a portion of a manual data validation user interface that includes a data entry form field 502, in this example with a current value of "888-555-1348" displayed, and nearby to the form field, as displayed in the data entry form portion of the data validation interface, a snippet 504 taken from a corresponding document image, which shows just the portion of the document image that contains the image of the text (in this case numerical values) extracted from the document to populate the form field 502. In this example, a confirmation or other informational and/or error message 506 similarly is displayed near the form field 502. As a result, the form field 502, corresponding snippet 504, and confirmation message 506 are all in the line of sight, or nearly so, at the same time, enabling all information required to validate the value entered in the form field 502, including entering any correction that may be required, to be viewed at the same time and/or with minimal eye or head movement and without requiring the operator to scan back and forth between the document image frame and the data entry form, and/or to scroll, pan, or zoom in/out in the document image as viewed to locate and scale to a readable size the text to be validated. In some embodiments, the snippet 504 is scaled to ensure readability, for example by including in the snippet only (or mostly) the text to be validated and scaling the image to a readable size, for example until the image is of at least a prescribed minimum size and/or the displayed characters are of a prescribed minimum "point" or other size.

In some embodiments, as an operator finishes validation of a field, indicated for example by pressing the "enter" key or selecting another key or on screen control, the system automatically pans to the next data entry form field, retrieves and displays near the form field a corresponding document image snippet. In this way, the operator can navigate through the form and corresponding portions of the document image without retargeting, i.e., without having to redirect their eyes to a different point or points on the screen.

Figure 6:
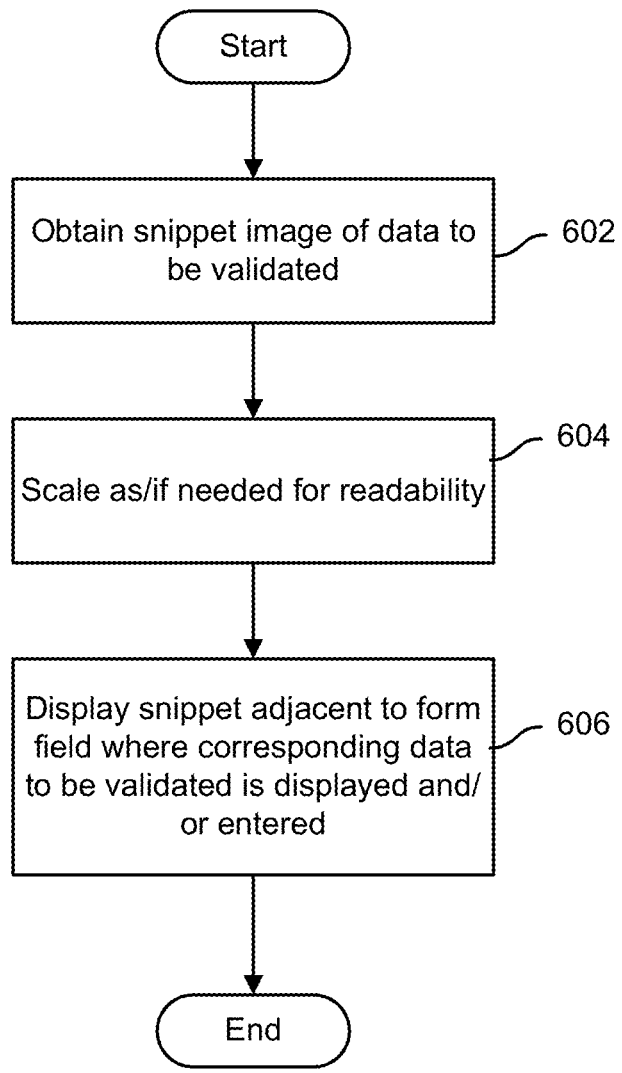
FIG. 6 is a flow chart illustrating an embodiment of a process to facilitate manual indexing.

FIG. 6 is a flow chart illustrating an embodiment of a process to facilitate manual indexing. In various embodiments, the process of FIG. 6 is used to provide an interface such as the one shown and described above in connection with FIG. 5. In the example shown in FIG. 6, a snippet containing the text or other document image portion corresponding to a data entry form field to be validated is obtained, and an association between the snippet and/or the associated location in the document image, on the one hand, and the corresponding form field, on the other hand, is stored (602). The snippet is scaled as/if need for readability (604). The scaled (if applicable) snippet is displayed adjacent or otherwise near to the form field where corresponding extracted data to be validated is displayed and/or entered (606).

Figure 7A:
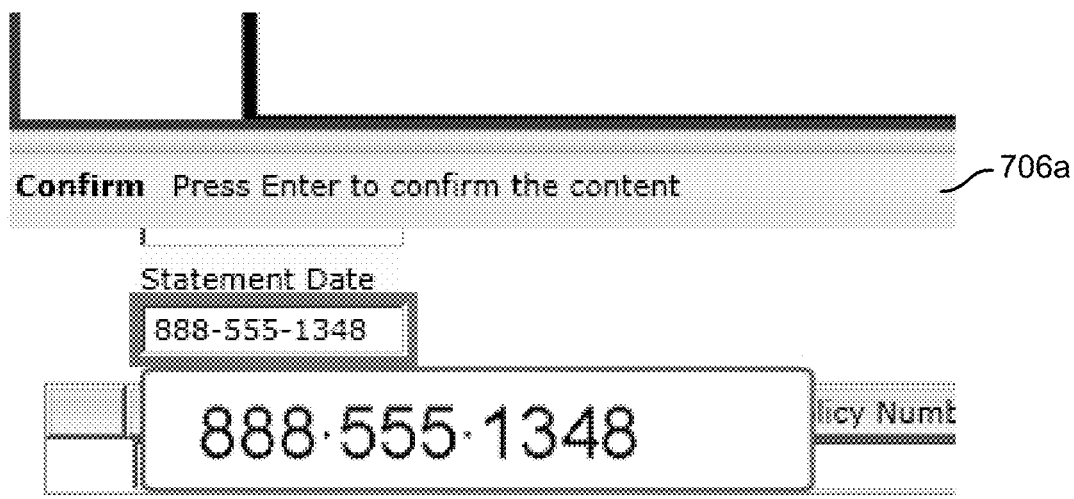
FIGS. 7A and 7B are screen shots illustrating an embodiment of a technique to minimize eye strain and/or fatigue in manual indexing.
Figure 7B:
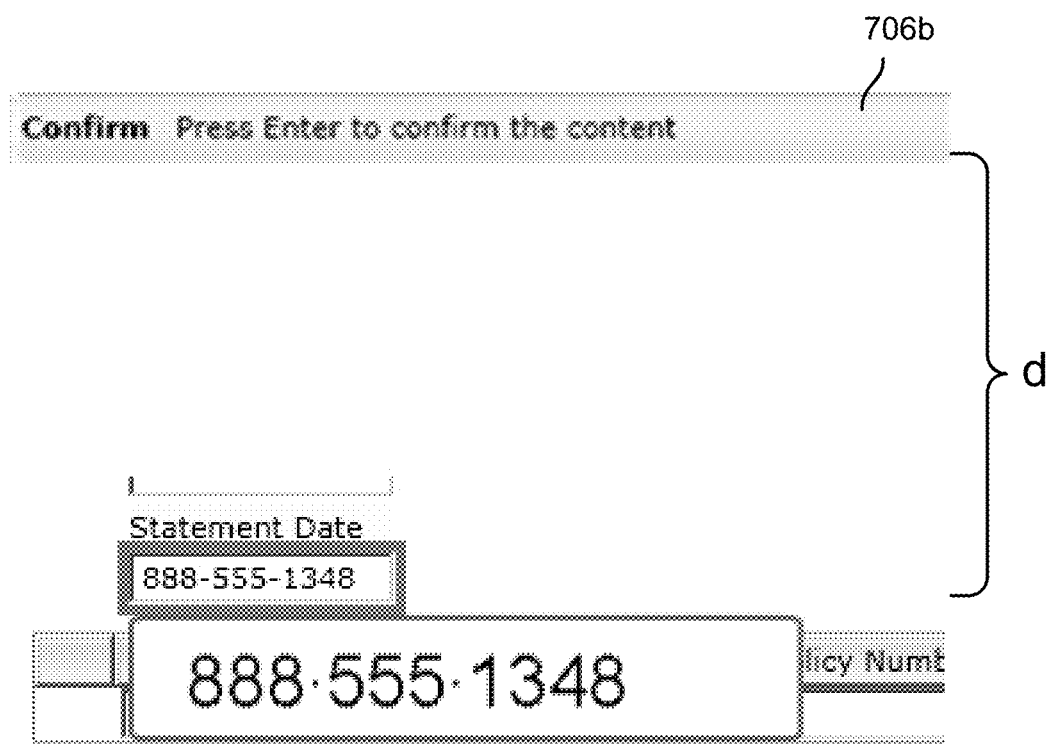

FIGS. 7A and 7B are screen shots illustrating an embodiment of a technique to minimize eye strain and/or fatigue in manual indexing. In the example shown in FIG. 7A, the data entry field, snippet, and confirmation message 706a are shown in the same locations as in FIG. 5, i.e., all in close proximity. In the example shown in FIG. 7B, the confirmation message 706b is displayed at a location a distance "d" away from the data entry field and/or snippet. In some embodiments, approximately 95% of the time the validation interface elements (form field, snippet, confirmation message) are displayed as shown in FIG. 7A, to minimize the need to scan and/or retarget, while the remaining approximately 5% of the time the location of the confirmation (or error or other informational) message (e.g., 706b) is varied to a location that requires the eyes to move at least approximately 20% across the screen, to avoid eye strain and/or fatigue that may result from the operator focus continuously on the same set of nearby locations on the screen (e.g., "tunnel" vision-related fatigue or strain). While the example shown in FIGS. 7A and 7B involves displaying an informational message in a location that requires eye movement across the display, in various embodiments one or more other techniques to force eye movement away from a region of prolonged and/or primary focus may be used, including without limitation display a pop-up window, enforcing a break, or displaying a message instructing the user to exercise the user's eyes, e.g., in a specified way.

Figure 8:
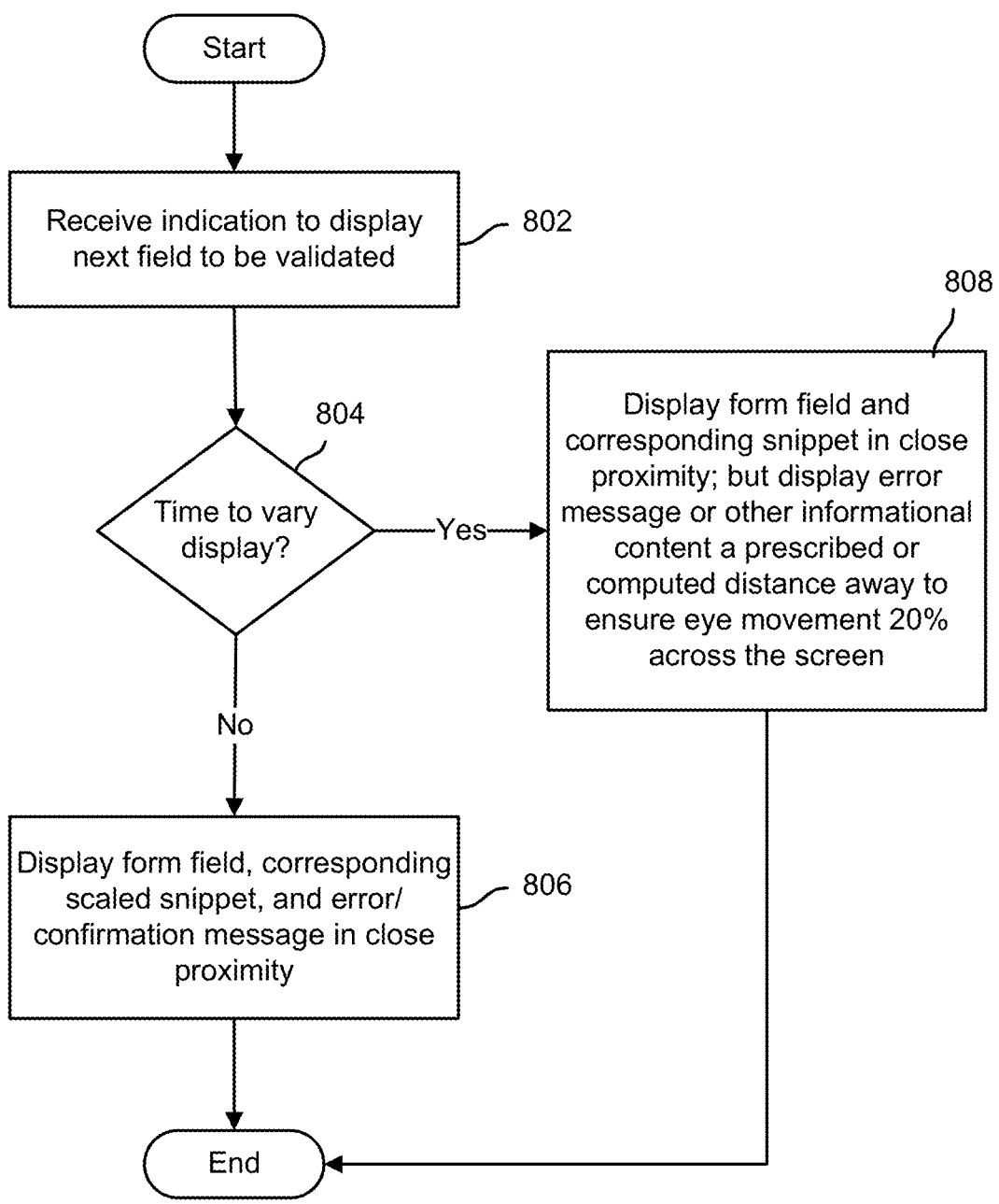
FIG. 8 is a flow chart illustrating an embodiment of a process to display data for validation.

FIG. 8 is a flow chart illustrating an embodiment of a process to display data for validation. In the example shown, an indication to display a next form field to be validated is received (802), for example, the operator presses "enter". A check is performed to determine whether it is time to vary the display (804). Examples include without limitation a prescribed interval, a prescribed number of fields (e.g., every 20$^{th}$ field), at random, and/or based on some other interval or rule. If it is not time to vary the display, then the form field, corresponding snippet, and confirmation message, in this example are displayed normally, i.e., in closer proximity (same field of vision, for example), as in FIG. 7A (806). If it is time to vary the display, then the form field and corresponding snippet are displayed in close proximity, but the confirmation message and/or other informational content and/or control is displayed at a prescribed distance from other elements (e.g., form field and snippet, in this example), at a distance sufficient to require eye movement across at least 20% (or some other prescribed amount) of the screen (808).

Figure 9:
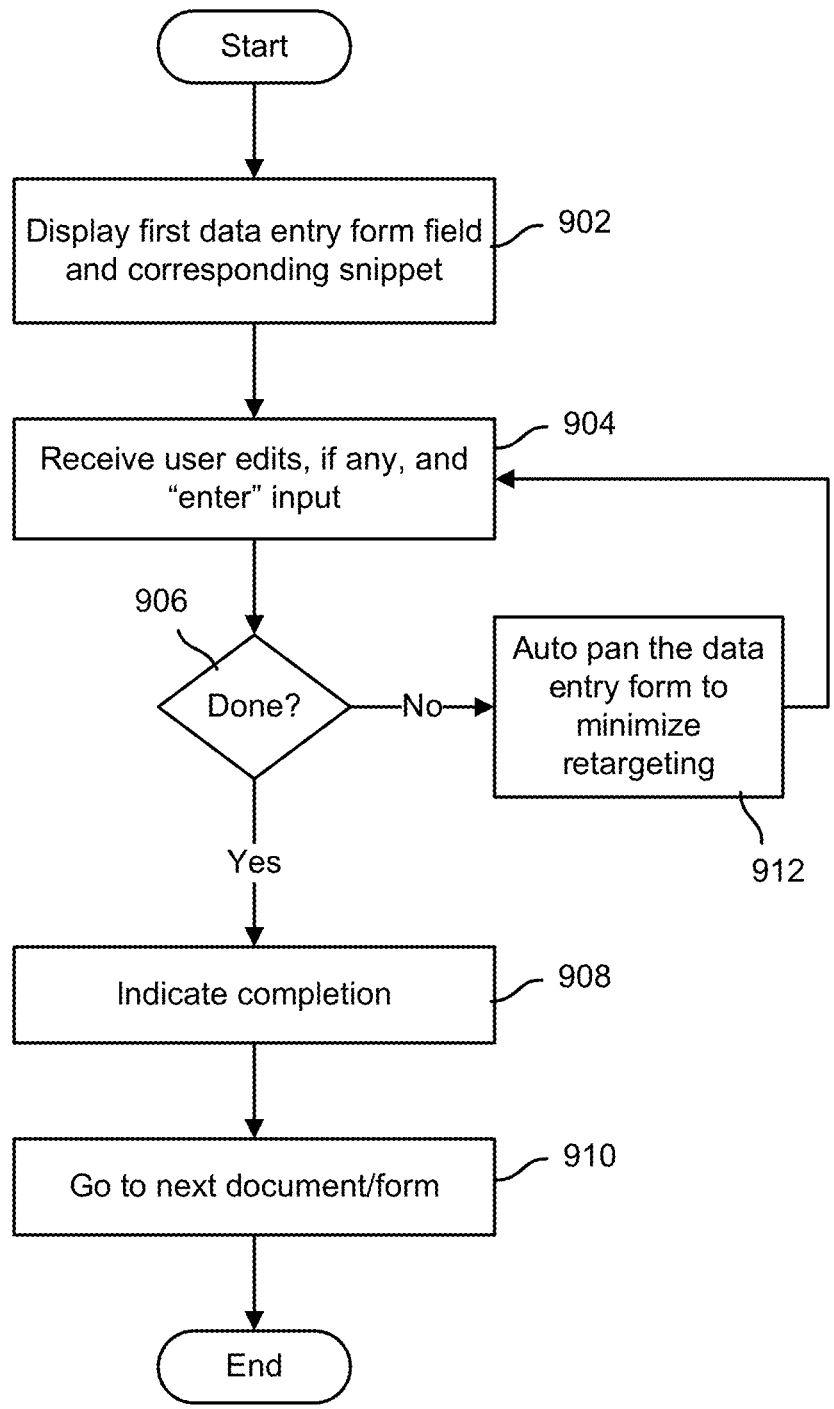
FIG. 9 is a flow chart illustrating an embodiment of a process to display data for validation.

FIG. 9 is a flow chart illustrating an embodiment of a process to display data for validation. In the example shown, a first data entry form field and corresponding snippet are displayed for validation (902). An "enter" or other input indicating that the operator has finished validating the current form field is received (904). If there are no other form fields in the current form that require validation (906), an indication that validation of the current form is completed is provided (908) and validation proceeds to a next scanned document and associated data entry form (910). If, however, other form fields remain in the current to be validated (906), an auto-pan to a next form field to be validated is performed, to minimize the need for the human operator (indexer) to retarget his/her eyes (912). In some embodiments, the data entry form portion of the validation interface is refreshed to cause the next form field and corresponding document image snippet to be displayed in the same or approximately the same location as the previous form field the validation of which was just completed.

Using techniques disclosed herein, eye strain, operator fatigue, and/or retargeting may be minimized, thereby decreasing the human cost and increasing the efficiency and/or throughput of manual indexing operations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of minimizing human eye strain and increasing visual target speed in validating data, comprising:
    displaying a validation interface on a display screen with a first set of validation interface elements located on the display screen based on a first layout of validation interface elements according to which a first type of validation interface element is to be displayed a first distance from a second type of validation interface element, the first set of validation interface elements comprising a first data entry form field to be validated;
    receiving, by a processor, an input comprising an indication to display, in the validation interface, a next data entry form field to be validated;
    automatically determining, by the processor, locations at which to display a second set of validation interface elements, wherein determining the locations at which to display the second set of validation interface elements comprises determining, based on display variation selection criteria, whether to vary a display of the validation interface from the first layout of validation interface elements to a second layout of validation interface elements according to which the first type of validation interface element is to be displayed a second distance apart from the second type of validation interface element, the second distance being greater than the first distance and selected to require eye movement at least twenty percent across the display screen; and
    based on a determination to vary the display of the validation interface from the first layout of validation interface elements to the second layout of validation interface elements, updating the display of the validation interface to display the second set of validation interface elements at the determined locations with the first type of validation interface element displayed the second distance apart from the second type of validation interface element, wherein the second set of validation interface elements comprises the next data entry form field containing a current value extracted from a document image, a snippet associated with the next data entry form field and that is a portion of the document image from which the current value was extracted, and a validation message.

2. The method of claim 1, wherein updating the display of the validation interface comprises updating the display of the validation interface to display the next data entry form field adjacent to the snippet associated with the next data entry form field.

3. The method of claim 1, wherein the first set of validation interface elements comprises a snippet associated with the first data entry form field and the validation message, displaying the validation interface on the display screen with the first set of validation interface elements located based on the first layout of validation interface elements comprises displaying the validation message the first distance from at least one of the first data entry form field or the snippet associated with the first data entry form field, and updating the display of the validation interface comprises displaying the validation message the second distance from at least one of the next data entry form field or the snippet associated with the next data entry form field.

4. The method of claim 3, wherein displaying the validation interface on the display screen with the first set of validation interface elements located based on the first layout of validation interface elements comprises displaying the first data entry form field, the snippet associated with the first data entry form field and the validation message along a line of eye motion.

5. The method of claim 1, wherein the validation interface includes a user interface for a human operator to enter a corrected value associated with the next data entry form field.

6. The method of claim 1, further comprising automatically panning to the next data entry form field based on the indication to display the next data entry form field.

7. The method of claim 1, wherein the display variation selection criteria are selected to cause the display of the validation interface to vary to the second layout of validation interface elements based on a number times the first layout of validation interface elements was used for validation of previous data entry form fields.

8. The method of claim 1, wherein the display variation selection criteria specify an interval for varying the display of the validation interface.

9. A computer program product embodied on a non-transitory computer readable storage medium storing instructions executable by a processor to:
   display a validation interface on a display screen with a first set of validation interface elements located based on a first layout of validation interface elements according to which a first type of validation interface element is to be displayed a first distance from a second type of validation interface element, the first set of validation interface elements comprising a first data entry form field to be validated;
   receive an input comprising an indication to display, in the validation interface, a next data entry form field to be validated;
   automatically determine, by the processor, locations at which to display a second set of validation interface elements, wherein determining the locations at which to display the second set of validation interface elements comprises determining, based on display variation selection criteria, whether to vary a display of the validation interface from the first layout of validation interface elements to a second layout of validation interface elements according to which the first type of validation interface element is to be displayed a second distance apart from the second type of validation interface element, the second distance being greater than the first distance and selected to require eye movement at least twenty percent across the display screen; and
   based on a determination to vary the display of the validation interface from the first layout of validation interface elements to the second layout of validation interface elements, update the display of the validation interface to display the second set of validation interface elements at the determined locations with the first type of validation interface element displayed the second distance apart from the second type of validation interface element, wherein the second set of validation interface elements comprises the next data entry form field to display a current value extracted from a document image, a snippet associated with the next data entry form field and that is a portion of the document image from which the current value was extracted, and a validation message.

10. The computer program product of claim 9, comprising instructions executable to update the display of the validation interface to display the next data entry form field adjacent to the snippet associated with the next data entry form field.

11. The computer program product of claim 9, comprising instruction executable to display the validation message the first distance from at least one of the first data entry form field or a snippet associated with the first data entry form field, and update the display of the validation interface to display the validation message the second distance from at least one of the next data entry form field or the snippet associated with the next data entry form field.

12. The computer program product of claim 11, comprising instructions executable to display the first data entry form field, the snippet associated with the first data entry form field and the validation message along a line of eye motion.

13. The computer program product of claim 9, wherein the validation interface includes a user interface for a human operator to enter a corrected value associated with the next data entry form field.

14. The computer program product of claim 9, further comprising instructions executable to automatically pan to the next data entry form field based on the indication to display the next data entry form field.

15. The computer program product of claim 9, wherein the display variation selection criteria are selected to cause the display of the validation interface to vary to the second layout of validation interface elements based on a number times the first layout of validation interface elements was used for validation of previous data entry form fields.

16. The computer program product of claim 9, wherein the display variation selection criteria specify an interval for varying the display of the validation interface.

17. A system for indexing captured documents, comprising:
   a display device comprising a display screen;

a processor coupled to the display device and configured to:
  display a validation interface on the display screen with a first set of validation interface elements located based on a first layout of validation interface elements according to which a first type of validation interface element is to be displayed a first distance from a second type of validation interface element, the first set of validation interface elements comprising a first data entry form field to be validated;
  receive an input comprising an indication to display, in the validation interface, a next data entry form field to be validated on the display screen;
  automatically determine locations at which to display a second set of validation interface elements, wherein determining the locations at which to display the second set of validation interface elements comprises determining, based on display variation selection criteria, whether to vary a display of the validation interface from the first layout of validation interface elements to a second layout of validation interface elements according to which the first type of validation interface element is to be displayed a second distance apart from the second type of validation interface element, the second distance being greater than the first distance and selected to require eye movement at least twenty percent across the display screen; and
  based on a determination to vary the display of the validation interface from the first layout of validation interface elements to the second layout of validation interface elements, update the display of the validation interface to display the second set of validation interface elements at the determined locations with the first type of validation interface element displayed the second distance apart from the second type of validation interface element, wherein the second set of validation interface elements comprises the next data entry form field to display a current value extracted from a document image, a snippet associated with the next data entry form field and that is a portion of the document image from which the current value was extracted, and a validation message.

18. The system of claim 17, wherein the processor is configured to update the display of the validation interface to display the next data entry form field adjacent to the snippet associated with the next data entry form field.

19. The system of claim 17, comprising instruction executable to display the validation message the first distance from at least one of the first data entry form field or a snippet associated with the first data entry form field, and update the display of the validation interface to display the validation message the second distance from at least one of the next data entry form field or the snippet associated with the next data entry form field.

20. The system of claim 19, wherein the processor configured to display the first data entry form field, the snippet associated with the first data en form field and the validation message along a line of eye motion.

21. The system of claim 17, wherein the validation interface includes a user interface for a human operator to enter a corrected value associated with the next data entry form field.

22. The system of claim 17, wherein the processor is configured to automatically pan to the next data entry form field based on the indication to display the next data entry form field.

23. The system of claim 17, wherein the display variation selection criteria are selected to cause the display of the validation interface to vary to the second layout of validation interface elements based on a number times the first layout of validation interface elements was used for validation of previous data entry form fields.

24. The system of claim 17, wherein the display variation selection criteria specify an interval for varying the display of the validation interface.

* * * * *

UNITED STATES PATENT AND TRADEMARK OFFICE
CERTIFICATE OF CORRECTION

Page 1 of 1

PATENT NO. : 10,769,357 B1
APPLICATION NO. : 13/720630
DATED : September 8, 2020
INVENTOR(S) : Ming Fung Ho It is certified that error appears in the above-identified patent and that said Letters Patent is hereby corrected as shown below:

In the Claims

Column 10, at Line 20, delete "en" and insert --entry--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*